(12) United States Patent
Chang et al.

(10) Patent No.: US 6,711,310 B2
(45) Date of Patent: Mar. 23, 2004

(54) HIGH POWER FIBER ISOLATOR

(75) Inventors: Kok Wai Chang, Los Altos, CA (US); Qingdong Guo, Sunnyvale, CA (US)

(73) Assignee: JDS Uniphase Corporation, San Jose, CA (US)

( * ) Notice: Subject to any disclaimer, the term of this patent is extended or adjusted under 35 U.S.C. 154(b) by 95 days.

(21) Appl. No.: 09/822,506

(22) Filed: Apr. 2, 2001

(65) Prior Publication Data

US 2003/0091260 A1 May 15, 2003

(51) Int. Cl.[7] ................................................. G02B 6/00
(52) U.S. Cl. ........................................... 385/11; 385/34
(58) Field of Search ..................................... 385/34, 11

(56) References Cited

U.S. PATENT DOCUMENTS

| | | | |
|---|---|---|---|
| 4,974,944 A | * 12/1990 | Chang | ......................... 359/282 |
| 5,033,830 A | 7/1991 | Jameson | ..................... 350/403 |
| 5,208,876 A | 5/1993 | Pan | .............................. 385/11 |
| 5,345,329 A | 9/1994 | Shirai et al. | ................. 359/282 |
| 5,546,486 A | 8/1996 | Shih et al. | ..................... 385/31 |
| 5,661,829 A | 8/1997 | Zheng | ......................... 385/33 |
| 5,734,762 A | 3/1998 | Ho et al. | ....................... 385/11 |
| 6,088,153 A | 7/2000 | Anthon et al. | ............... 359/341 |
| 6,288,826 B1 | * 9/2001 | Wills | ........................... 359/282 |
| 6,317,250 B1 | * 11/2001 | Guan et al. | ............... 324/244.1 |
| 6,396,629 B1 | * 5/2002 | Cao | ........................... 359/122 |

* cited by examiner

*Primary Examiner*—Hung N. Ngo
(74) *Attorney, Agent, or Firm*—Hall, Priddy, Myers & Vande Sande

(57) ABSTRACT

The invention provides an optical isolator including a light collector for redirecting and/or absorbing backward propagating radiation. In the preferred embodiment, the light collector includes at least one of a light absorbing material and a light redirector that does not interfere with forward propagating radiation, but collects the unwanted backward propagating light. Accordingly, the light collecting means are suitable for high power applications for protecting the input optics, including epoxy used to secure the input optical fiber, from unwanted reflected light. Some examples of appropriate light collecting means include neutral density filters, polarizers, mirrors, and right angle prisms.

20 Claims, 3 Drawing Sheets

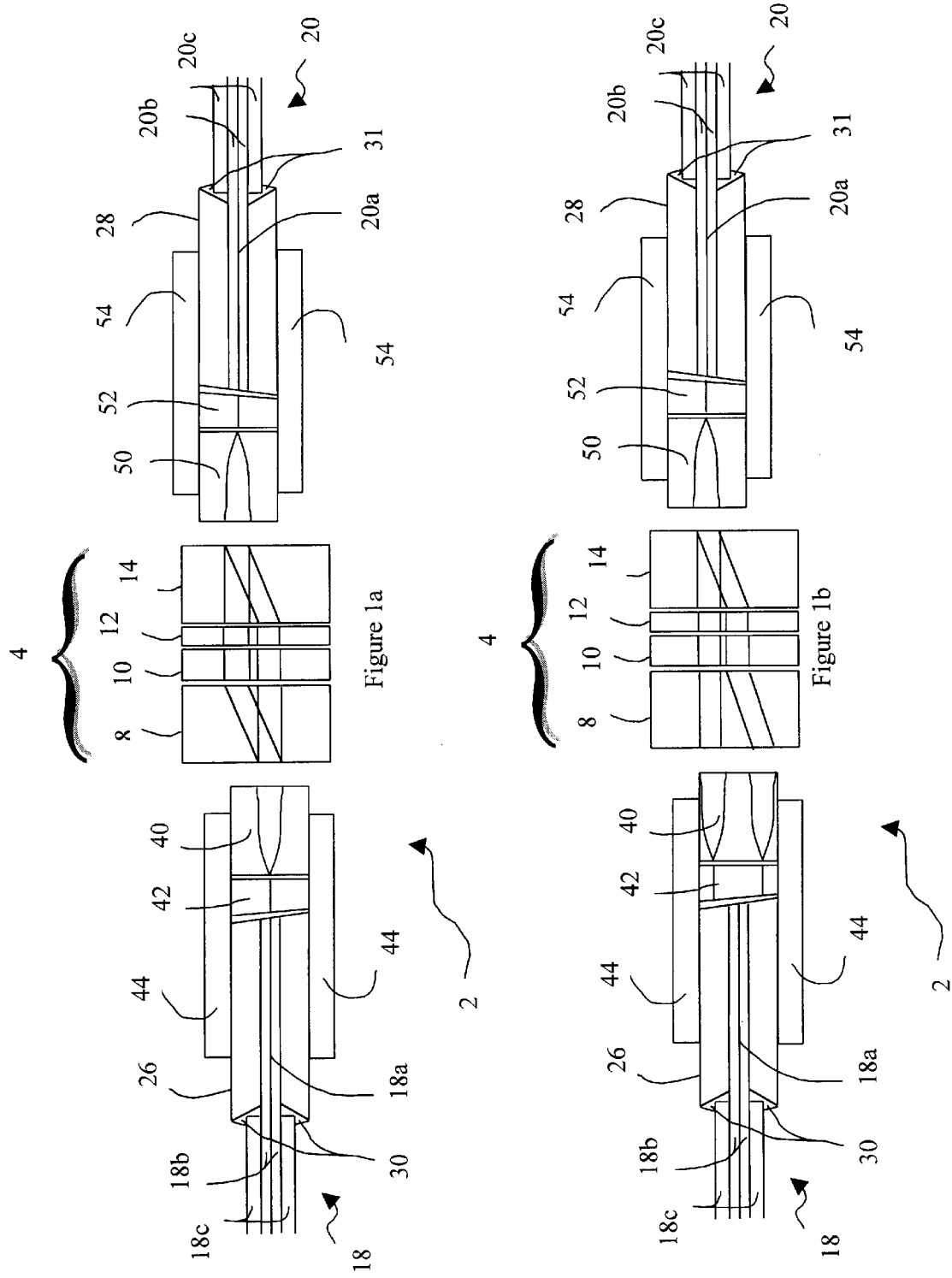

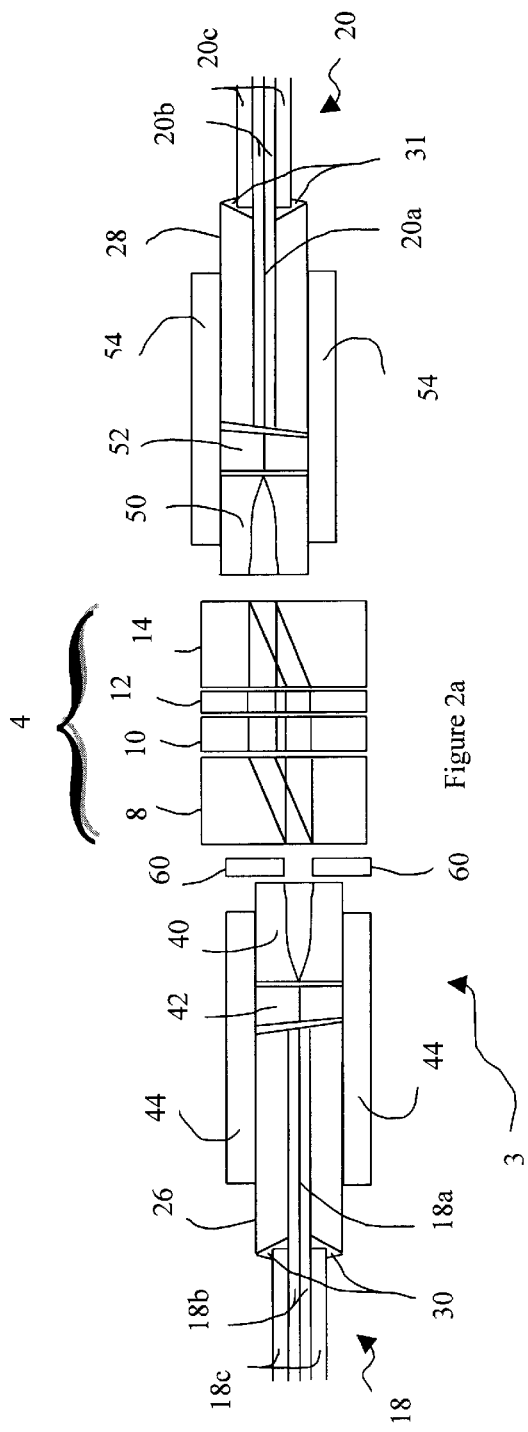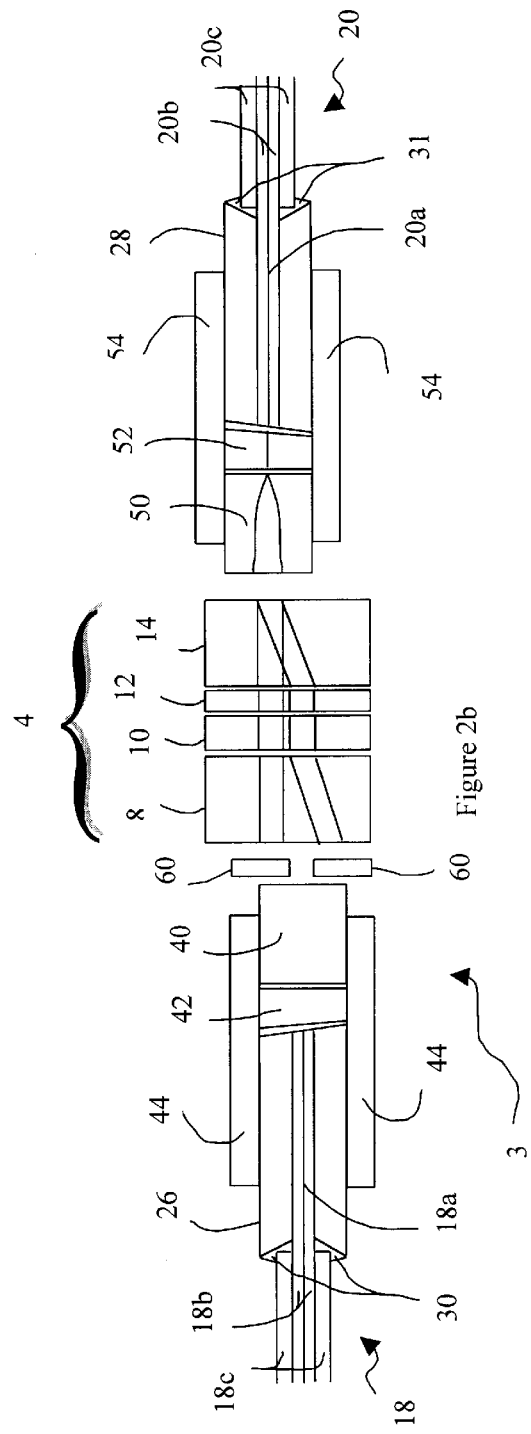

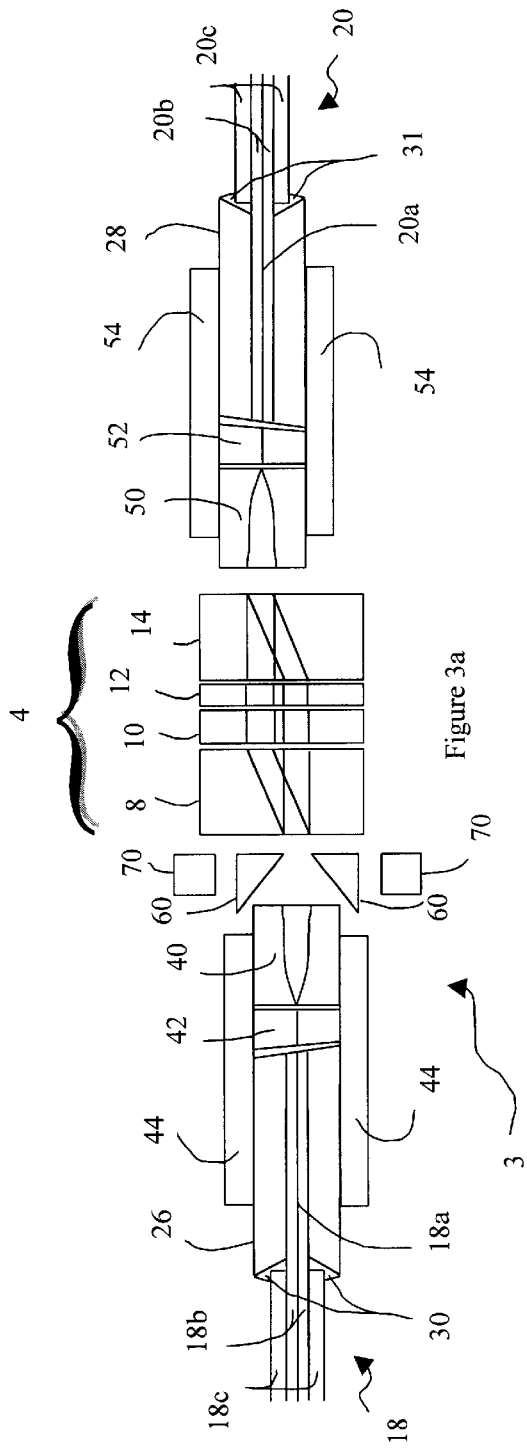
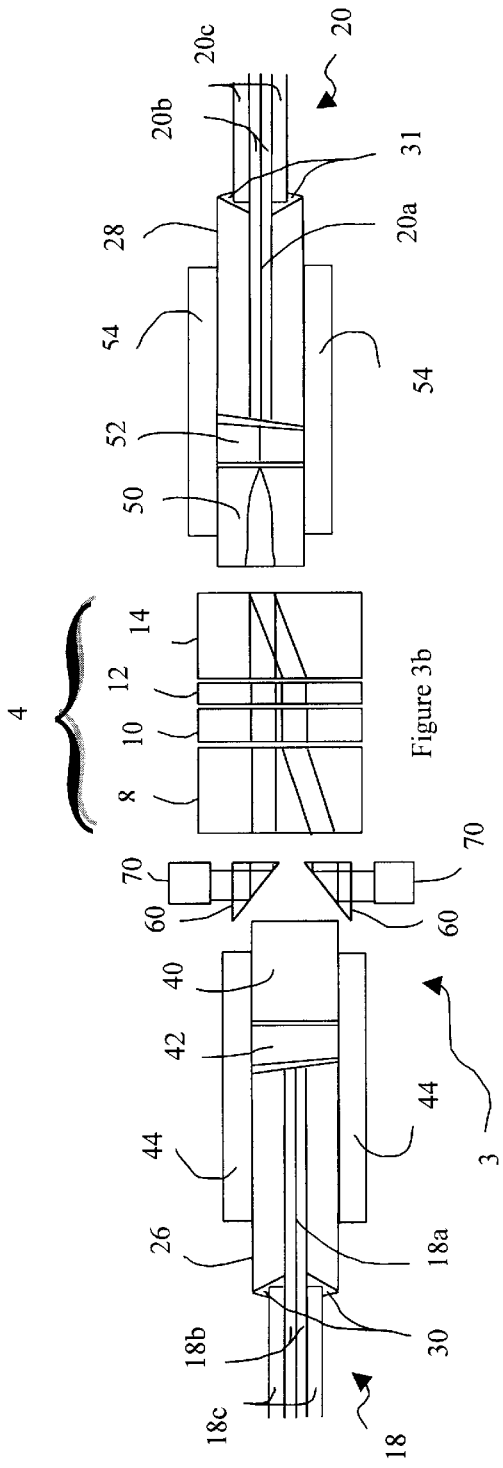
Figure 3a
Figure 3b

HIGH POWER FIBER ISOLATOR

FIELD OF THE INVENTION

This invention relates generally to the field of optical isolators and more specifically to an optical isolator for use in high power applications.

BACKGROUND OF THE INVENTION

Optical isolators are one of the most ubiquitous of all passive optical components found in optical communication systems. Generally, optical isolators are used to allow signals to propagate in a forward direction but not in a backward direction. They are frequently used to prevent unwanted back reflections from being transmitted back to a transmitting source such as a laser.

Referring to FIG. 1a, there is shown a polarization insensitive optical isolator. The isolator 2 includes an isolator core 4 comprising a first birefringent crystal 8, a non-reciprocal rotator in the form of a Faraday rotator 10, a reciprocal rotator in the form of a half-waveplate 12, and a second birefringent crystal 14. The Faraday rotator 10 is typically formed from doped garnet or YIG, and is placed in a permanent magnet. On one side of the isolator core is placed an input optical fiber 18 and on the other side is placed an output optical fiber 20. The jacket 18c of input optical fibre 18 is stripped away and an exposed end of the core 18a and cladding 18b of the input 18 optical fibre is secured in a ferrule 26 with epoxy 30. Similarly, an exposed end of the core 20a and cladding 20b of the output 20 fibre is secured in a ferrule 28 with epoxy 31. Preferably, the ferrules 26 and 28 have a predetermined angle selected to reduce backreflection. Lens 40 and optional spacer 42 are optically coupled to the ferrule 26 and optical fibre 18, and held in place with a sleeve 44. Similarly, lens 50 and optional spacer 52 are optically coupled to ferrule 28 and optical fibre 20, and are held in place with sleeve 54.

In operation, an optical signal launched from the core 18a of the input fibre is collimated and transmitted through the first birefringent crystal 8, where it is separated into two orthogonally polarized sub-beams of light. More specifically, the two orthogonal sub-beams are depicted as the O-ray and the E-ray components, wherein the E-ray experiences a spatial displacement as it traverses the birefringent crystal 8. The two rays pass through the Faraday rotator 10 wherein the polarization of each sub-beam is rotated by 45° and the half waveplate 12 wherein the polarization of each sub-beam is rotated another 45°, for a total rotation of about 90°. Since the polarization of each ray is rotated by 90°, the E-ray component is unaffected as it passes through the second birefringent crystal 14, whereas the O-ray component experiences spatial displacement. The two rays are recombined and focussed onto the core of the output fibre 20a.

Referring to FIG. 1b, a ray diagram showing an optical signal launched from the core of the output fibre 20a to the second birefringent crystal 14 is shown. The second birefringent crystal separates the optical signal into two orthogonal rays corresponding to the O-ray and the E-ray components, wherein the E-ray experiences a spatial displacement as it traverses the birefringent crystal 8. The two rays of light are then passed through the half waveplate 12 and the Faraday rotator 10. Since the half waveplate 12 is a reciprocal device, whereas the Faraday rotator 10 is a non-reciprocal device, a total rotation of about 0° is observed and the first birefringent crystal 8 does not recombine the two rays. More specifically, the E-ray component experiences a further spatial displacement, whereas the O-ray component passes through the second birefringent crystal 14 unaffected, such that the two rays are focussed on points away from the core 18a of the first optical fibre, thus providing isolation in the reverse direction.

Improvements, or modifications, in optical isolators include adding a reflector, replacing the half waveplate with a third birefringent crystal, designing the optical components with wedge angles, adding lenses, adding polarization diversity, and/or adding additional components for improving isolation (e.g., multi-stage optical isolators). For example, see U.S. Pat. Nos. 5,033,830, 5,208,876, 5,345,329, 5,734,762, and 6,088,153 incorporated herein by reference.

As described above, a disadvantage of the isolator shown in FIGS. 1a and 1b is that it directs the backward propagating light to points surrounding the input core 18a. For example, the backward propagating light is directed to locations ranging from the input optical fibre cladding 18b to the ferrule 26, depending on the length of the first birefringent crystal (e.g., 8) and the optical arrangement. For low power applications this may be acceptable, however, for high power applications this results in significant damage of the optics and/or system degradation/failure. For example, one significant problem arises when backward propagating high power light is transmitted to the ferrule and degrades the epoxy (e.g., 30) used to secure and align the optical components. The degradation of epoxy in optical isolators is discussed in U.S. Pat. No. 5,661,829, incorporated herein by reference. Other examples include the burning or damaging of other optics due to excessive heating and/or high power radiation.

In U.S. Pat. No. 5,546,486 to Shih et al. there is disclosed an optical isolator including an input fiber having a reflective optical barrier layer, such as gold, that covers the end surface of the fiber with an aperture exposing the core and covering the cladding of the fiber. Although, this improvement substantially reduces light transmission into the end of the optical fiber via the cladding, thus improving the isolation, it does not protect the other optical components from the high power radiation. In fact, the device taught by Shih et al. is not compatible with high power applications, since the reflective layer produces additional reflections that may introduce noise and/or damage other optical components. For example, if the reflective layer is soiled with dust or another impurity, it might ignite in high power applications.

It is an object of this invention to provide an optical isolator that obviates the above mentioned disadvantages.

It is a further object of this invention to provide an optical isolator for use in high power applications.

SUMMARY OF THE INVENTION

The instant invention provides an optical isolator for use in high power applications that includes a light collector for redirecting and/or absorbing backward propagating radiation. In the preferred embodiment, the light collector does not interfere with forward propagating radiation, but collects or gathers the backward propagating light.

In accordance with the invention there is provided a method for protecting isolator components from high intensity backreflections in an optical isolator comprising a first port for launching light in a forward propagating direction, a second port for receiving the light launched from the first port and for transmitting light in a backward propagating direction towards the first port, and an isolator core optically disposed between the first and second ports including a first birefringent crystal, a non-reciprocal rotator, and a second birefringent crystal, the method comprising the step of: providing light collecting means for substantially unaffecting forward propagating light launched from the first port and for collecting and isolating backward propagating light transmitted from the isolator core.

In accordance with the invention there is provided an optical isolator comprising: a first port; a second port optically coupled to the first port; an isolator core optically disposed between the first port and the second port comprising a first birefringent crystal, a non-reciprocal rotator, and a second birefringent crystal for transmitting forward propagating light from the first port to the second port and for preventing backward propagating light transmitted from the second port from coupling to the first port; and light collecting means for substantially collecting backward propagating light transmitted from the isolator core to prevent damage to other optical components without substantially affecting forward propagating light launched from the first port.

In accordance with the invention there is provided an optical isolator comprising: a first port; a second port optically coupled to the first port; an isolator core comprising a first birefringent crystal, a non-reciprocal rotator, a reciprocal rotator, and a second birefringent crystal disposed such that a forward propagating beam of light launched from the first port is separated into two sub-beams of light having orthogonal polarizations by the first birefringent crystal, which are recombined into a single beam of light by the second birefringent crystal and transmitted to the second port, and such that a backward propagating beam of light transmitted from the second port is separated into two backward propagating sub-beams of light having orthogonal polarizations by the second birefringent crystal, which are further spatially separated by the first birefringent crystal and transmitted away from the first port; and light collecting means disposed for substantially collecting the two backward propagating further spatially separated sub-beams of light to prevent damage to other optical components.

In accordance with the invention there is provided an optical isolator comprising: a first optical fibre having an exposed end including a core and a cladding secured in a first ferrule; a second optical fibre optically coupled to the first optical fibre having an exposed end including a core and a cladding secured in a second ferrule; an isolator core optically disposed between the first and second optical fibres comprising a first birefringent crystal, a non-reciprocal rotator, a reciprocal rotator, and a second birefringent crystal for directing forward propagating light from the core of the first optical fibre to the core of the second optical fibre and for directing backward propagating light transmitted from the core of the second optical fibre away from the core of the first optical fibre; and light collecting means for collecting backward propagating light transmitted from the isolator core and substantially preventing it from impinging on the first ferrule without substantially affecting forward propagating light.

BRIEF DESCRIPTION OF THE DRAWINGS

Exemplary embodiments of the invention will now be described in conjunction with the drawings in which:

FIG. 1a is a schematic diagram of an optical isolator showing light rays travelling in a forward direction;

FIG. 1b is a schematic diagram of the optical isolator shown in FIG. 1a showing light rays travelling in a backward isolating direction;

FIG. 2a is a schematic diagram of an optical isolator in accordance with the instant invention showing light rays travelling in a forward direction;

FIG. 2b is a schematic diagram of the optical isolator shown in FIG. 2a showing light rays travelling in a backward isolating direction;

FIG. 3a is a schematic diagram of another embodiment of an optical isolator in accordance with the instant invention showing light rays travelling in a forward direction; and FIG. 3b is a schematic diagram of the optical isolator shown in FIG. 3a showing light rays travelling in a backward isolating direction.

DETAILED DESCRIPTION OF THE PREFERRED EMBODIMENTS

Referring to FIGS. 2a and 2b there is shown an embodiment of a high power optical isolator in accordance with the instant invention. The isolator 3 includes an isolator core 4 having a first birefringent crystal 8, a non-reciprocal rotator 10, a reciprocal rotator 12, and a second birefringent crystal 14. For example, in the preferred embodiment the non-reciprocal rotator is a Faraday rotator, the reciprocal rotator is a half waveplate, and the birefringent crystals 8 and 14 are polarizing beamsplitters or walk-off crystals constructed from an appropriate material. On one side of the isolator core 4 is placed an input optical fiber 18 and on the other side is placed an output optical fiber 20. The jacket 18c of input fibre 18 is stripped away and an exposed end of the core 18a and cladding 18b of the input 18 optical fibre is secured in a ferrule 26 with epoxy 30 to help secure and align the fibre 18. Similarly, an exposed end of the core 20a and cladding 20b of the output 20 fibre is secured in a ferrule 28 with epoxy 31. Preferably, the ferrules 26 and 28, which for example are glass capillaries, are polished with a predetermined angle selected to reduce backreflection. Optionally, lens 40 and spacer 42 are optically coupled to the ferrule 26 and optical fibre 18 and held in place with a sleeve 44. Similarly, lens 50 and spacer 52 are optionally optically coupled to ferrule 28 and optical fibre 20 and held in place with sleeve 54. The lens 50, which is conveniently shown as a GRIN lens, is any collimating/focussing lens. Light collecting means 60 in the form of a light absorbing material is disposed between the input optical fibre 18 and the first birefringent crystal 8. The light absorbing material 60 is disposed substantially out of the optical path of a forward propagating beam of light launched from the core of the input optical fibre 18a as shown in FIG. 2a, but in the optical path of a backward propagating beam of light transmitted through the core of the output optical fibre 20a as shown in FIG. 2b. In other words, the light absorbing material 60 is disposed to substantially collect the backward reflected light without affecting forward propagating light. For example, the light absorbing material could be composed of two separate components disposed peripherally about the core 18a of the input fibre or a single component having an aperture coinciding with the core 18a. Advantageously, these arrangements need little alignment in manufacturing. Preferably, the light absorbing material 60 blocks the reflected light from impinging upon the ferrule 26, and hence the epoxy 30, and at least reduces the amount of light reaching the cladding 18b.

Some examples of suitable light absorbing materials include neutral density filters, appropriately orientated polarizers (e.g., Polarcore™), and other optical stops. Preferably, the light absorbing material is spatially separated from the other optics or otherwise insulated to prevent heat transfer to the other optical components. Optionally, the light absorbing material 60 is thermally coupled to a heat sink (not shown).

In operation, an optical signal launched from the core 18a of the input fibre is collimated and transmitted through the first birefringent crystal 8, where it is separated into two orthogonally polarized sub-beams of light. More specifically, the two orthogonal sub-beams are depicted as the O-ray and the E-ray components, wherein the E-ray experiences a spatial displacement as it traverses the birefringent crystal 8. The two rays pass through the Faraday rotator 10 wherein the polarization of each sub-beam is rotated by 45° and the half waveplate 12 wherein the polarization of each sub-beam is rotated another 45°, for a total rotation of about 90°. Since the polarization of each ray is rotated by 90°, the E-ray component is unaffected as it passes through the second birefringent crystal 14, whereas the O-ray component experiences spatial displacement. The two rays are recombined and focussed onto the core of the output fibre 20a via lens 40.

Referring to FIG. 2b, a ray diagram showing an optical signal launched from the core of the output fibre 20a to the second birefringent crystal 14 is shown. The second birefringent crystal separates the optical signal into two orthogonal rays corresponding to the O-ray and the E-ray components, wherein the E-ray experiences a spatial displacement as it traverses the birefringent crystal 8. The two rays of light are then passed through the half waveplate 12 and the Faraday rotator 10. Since the half waveplate 12 is a reciprocal device, whereas the Faraday rotator 10 is a non-reciprocal device, a total rotation of about 0° is observed and the first birefringent crystal 8 does not recombine the two rays. More specifically, the E-ray component experiences a further spatial displacement, whereas the O-ray component passes through the second birefringent crystal 14 unaffected, such that the two rays are isolated by the light absorbing means 60 to avoid being focussed onto the ferrule.

Turning now to FIGS. 3a and 3b, there is shown another embodiment of a high power optical isolator in accordance with the instant invention. The isolator 3 includes an isolator core 4 having a first birefringent crystal 8, a non-reciprocal rotator 10, a reciprocal rotator 12, and a second birefringent crystal 14. For example, in the preferred embodiment the non-reciprocal rotator is a Faraday rotator, the reciprocal rotator is a half waveplate, and the birefringent crystals 8 and 14 are polarizing beamsplitters or walk-off crystals constructed from an appropriate material. On one side of the isolator core is placed an input optical fiber 18 and on the other side is placed an output optical fiber 20. An outward end of the jacket 18c of fibre 18 is stripped away and an exposed end of the core 18a and cladding 18b of the input 18 optical fibre is secured in a ferrule 26 with epoxy 30 to help secure and align the fibre 18. Similarly, an exposed end of the core 20a and cladding 20b of the output 20 fibre is secured in a ferrule 28 with epoxy 31. Preferably, the ferrules 26 and 28 are polished with a predetermined angle selected to reduce backreflection. Optionally, lens 40 and spacer 42 are optically coupled to the ferrule 26 and optical fibre 18 and held in place with a sleeve 44. Similarly, lens 50 and spacer 52 are optionally optically coupled to ferrule 28 and optical fibre 20 and held in place with sleeve 54. The lens 50, which is conveniently shown as a GRIN lens, could be any collimating/focussing lens. Light collecting means 60 in the form of a light redirector (e.g., a right angle prism) is disposed between the input optical fibre 18 and the first birefringent crystal 8. The light redirector 60 is disposed substantially out of the optical path of a forward propagating beam of light launched from the core of the input optical fibre 18a as shown in FIG. 3a, but in the optical path of a backward propagating beam of light transmitted from the core of the output optical fibre 20a as shown in FIG. 3b. More specifically, the light redirector 60 is disposed to substantially collect the backward reflected light without affecting forward propagating light.

Some examples of suitable light redirectors include reflective surfaces, right angle prisms, and other optics that define V-shaped, L-shaped, or other light paths away from the isolator components. Preferably, the light redirecting means 60 direct the reflected light to a light absorbing material/heat sink and/or detecting means 70 for monitoring an intensity of the reflected light.

The operation of this isolator is similar to that described with reference to FIGS. 2a and 2b. However, in the backward propagating direction, after the E-ray component experiences a further spatial displacement and the O-ray component passes through the second birefringent crystal 14 unaffected, the two rays are redirected by the light collecting means 60 to the light absorbing material/heat sink and/or detecting means 70.

In each of the embodiments described above with respect to FIGS. 2a,b and 3a,b, it may be advantageous for the collimating/focussing lens 40 to have a pitch less than about one quarter such than the focal length is increased, for example, from 2 to 3 mm. Increasing the focal length advantageously increases the beam diameter, thus decreasing power density and improving power handling. Different optical arrangements relating to lenses having a longer focal length are discussed further in U.S. patent application Ser. No. 09/818,908 filed on Mar. 28, 2001, to Kok Wai Chang, incorporated herein by reference. Notably, increasing the beam diameter also creates the need for longer birefringent crystals to provide adequate spatial separation of the input signal.

In each of the embodiments described heretofore, the light collecting means advantageously serve to collect the backward propagating light. Accordingly, the light collecting means protects the input optics, including the epoxy, from high power unwanted reflected light. The term collect as used herein refers to the gathering of light in a controlled manner such that the light is removed or directed away from the other components (e.g., birefringent crystal, optical fibre core, epoxy). Preferably, the light is removed or directed away from the other components to a trap or a heat sink.

Of course, numerous other embodiments can be envisaged without departing from the spirit and scope of the invention. For example, the invention described herein is not limited to the conventional isolators depicted in the figures, but extends to modified and improved isolators. Preferably, these modified and improved optical isolators have at least two birefringent crystals, a non-reciprocal rotator, and a reciprocal rotator.

What is claimed is:

1. A method for protecting isolator components from high intensity backreflections in an optical isolator comprising a first port for launching light in a forward propagating direction, a second port for receiving the light launched from the first port and for transmitting light in a backward propagating direction towards the first port, and an isolator core optically disposed between the first and second ports including a first birefringent crystal, a non-reciprocal rotator, and a second birefringent crystal, the method comprising the step of:

providing a light collector so constructed as to substantially unaffect forward propagating light launched from the first port and to collect and isolate backward propagating light transmitted from the isolator core, wherein the light collector includes at least one of a light absorbing material and a light redirector.

2. An optical isolator comprising:

a first port;

a second port optically coupled to the first port;

an isolator core optically disposed between the first port and the second port including a first birefringent crystal, a non-reciprocal rotator, and a second birefringent crystal for transmitting forward propagating light from the first port to the second port and for preventing backward propagating light from coupling to the first port; and a light collector so constructed as to substantially collect backward propagating light transmitted from the isolator core and to prevent damage to other optical components without substantially affecting forward propagating light launched from the first port.

3. An optical isolator according to claim 2, wherein the light collector comprises at least one of a light absorbing material and a light redirector.

4. An optical isolator according to claim 3, wherein the light absorbing material comprises one of a polarizer and a neutral density filter.

5. An optical isolator according to claim 3, wherein the light redirector comprises one of a mirror and a right angle prism.

6. An optical isolator according to claim 3, wherein the light collector is coupled to a heat sink.

7. An optical isolator according to claim 3, wherein the light collector is coupled to a detector.

8. An optical isolator according to claim 3, wherein the light collector is spatially separated from other optical components.

9. An optical isolator comprising:

a first port;

a second port optically coupled to the first port;

an isolator core including a first birefringent crystal, a non-reciprocal rotator, a reciprocal rotator, and a second birefringent crystal disposed such that a forward propagating beam of light launched from the first port is separated into two sub-beams of light having orthogonal polarizations by the first birefringent crystal, which are recombined into a single beam of light by the second birefringent crystal and transmitted to the second port, and such that a backward propagating beam of light transmitted from the second port is separated into two backward propagating sub-beams of light having orthogonal polarizations by the second birefringent crystal, which are further spatially separated by the first birefringent crystal and transmitted away from the first port; and light collecting means disposed for substantially collecting the two backward propagating further spatially separated sub-beams of light to prevent damage to other optical components.

10. An optical isolator according to claim 9, wherein the light collecting means comprises at least one of a polarizer, a neutral density filter, a mirror, a right angle prism, and a heat sink.

11. An optical isolator according to claim 10, wherein the light collecting means is coupled to a detector.

12. An optical isolator according to claim 10, wherein the light collecting means are spatially separated from other optical components.

13. An optical isolator comprising:

a first optical fibre having an exposed end including a core and a cladding secured in a first ferrule;

a second optical fibre optically coupled to the first optical fibre having an exposed end including a core and a cladding secured in a second ferrule;

an isolator core optically disposed between the first and second optical fibres including a first birefringent crystal, a non-reciprocal rotator, a reciprocal rotator, and a second birefringent crystal for directing forward propagating light from the core of the first optical fibre to the core of the second optical fibre and for directing backward propagating light transmitted from the core of the second optical fibre away from the core of the first optical fibre; and light collecting means for collecting backward propagating light transmitted from the isolator core and substantially preventing it from impinging on the first ferrule without substantially affecting forward propagating light.

14. An optical isolator according to claim 13, comprising a first lens disposed between the first optical fibre and the isolator core and a second lens disposed between the second optical fibre and the isolator core.

15. An optical isolator according to claim 14, wherein the first and second lenses are GRIN lenses.

16. An optical isolator according to claim 15, further comprising a first spacer disposed between the first optical fibre and the first lens and a second spacer disposed between the second lens and the second optical fibre, respectively.

17. An optical isolator according to claim 16, further comprising a first sleeve for securing the first ferrule, the first spacer, and the first lens, and a second sleeve for securing the second ferrule, the second spacer, and the second lens in a predetermined arrangement.

18. An optical isolator according to claim 17, wherein the light collecting means comprises at least one of a polarizer, a neutral density filter, a mirror, a right angle prism, and a heat sink.

19. An optical isolator according to claim 18, wherein the light collecting means is coupled to a detector.

20. An optical isolator according to claim 18, wherein the light collecting means are spatially separated from other optical components.

* * * * *